US012561695B2

(12) United States Patent
Larko et al.

(10) Patent No.: US 12,561,695 B2
(45) Date of Patent: Feb. 24, 2026

(54) COMMUNICATION NETWORK AND METHOD FOR ROUTING DATA MESSAGES ON NETWORKS HAVING DIFFERENT COMMUNICATION PROTOCOLS

(71) Applicant: MASTERCARD INTERNATIONAL INCORPORATED, Purchase, NY (US)

(72) Inventors: John Larko, Wildwood, MO (US); Michelle L. Hafner, Chesterfield, MO (US); Bradford R. Dillahunty, Chesterfield, MO (US); Brenda Renee Hopkins, Wildwood, MO (US); John D. Chisholm, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 270 days.

(21) Appl. No.: 18/224,933

(22) Filed: Jul. 21, 2023

(65) Prior Publication Data

US 2023/0360059 A1     Nov. 9, 2023

Related U.S. Application Data

(63) Continuation of application No. 15/593,008, filed on May 11, 2017, now abandoned.

(Continued)

(51) Int. Cl.
| | |
|---|---|
| *G06Q 30/016* | (2023.01) |
| *G06Q 20/24* | (2012.01) |
| *G06Q 20/34* | (2012.01) |
| *G06Q 20/40* | (2012.01) |
| *G06Q 30/06* | (2023.01) |
| *H04L 67/10* | (2022.01) |

(52) U.S. Cl.
CPC ........... *G06Q 30/016* (2013.01); *G06Q 30/06* (2013.01); *H04L 67/10* (2013.01); *G06Q 20/24* (2013.01); *G06Q 20/34* (2013.01); *G06Q 20/407* (2013.01)

(58) Field of Classification Search
CPC ...... G06Q 20/02; G06Q 20/027; G06Q 20/04; G06Q 20/10; G06Q 20/12; G06Q 20/20;
(Continued)

(56) References Cited

U.S. PATENT DOCUMENTS

| | | |
|---|---|---|
| 5,000,806 A | 3/1991 | Merkatoris et al. |
| 6,783,065 B2 | 8/2004 | Spitz et al. |

(Continued)

FOREIGN PATENT DOCUMENTS

| | | |
|---|---|---|
| RU | 2518931 C2 | 6/2014 |
| WO | 2016109514 A1 | 7/2016 |

OTHER PUBLICATIONS

PCT International Search Report and Written Opinion, Application No. PCT/US2017/032121, dated Jun. 26, 2017, 10 pps.

*Primary Examiner* — Christopher Biagini
(74) *Attorney, Agent, or Firm* — Armstrong Teasdale LLP

(57) ABSTRACT

A computer system including a first network-based portal, a second network-based portal, and an analyzer computing device including at least one processor is provided. The at least one processor is configured to: (i) receive an initial data message including data elements, (ii) analyze, using machine learning tools, the data elements to determine to route the initial data message to the second network-based portal or to a processing computing device, (iii) in response to determining to route the initial data message to the second network-based portal, route the initial data message to the second network-based portal via a first network communication link, and (iv) in response to determining to route the initial data message to the processing computing device via a second network communication link, reformat the initial data message into a different protocol compatible with the second network communication link, and transmit the reformatted message to the processing computing device.

20 Claims, 6 Drawing Sheets

Related U.S. Application Data

(60) Provisional application No. 62/335,369, filed on May 12, 2016.

(58) Field of Classification Search
CPC ........ G06Q 20/24; G06Q 20/34; G06Q 20/40; G06Q 20/401; G06Q 20/4016; G06Q 20/405; G06Q 20/407; G06Q 30/016; G06Q 30/06; H04L 12/1403; H04L 2209/56; H04L 41/5051; H04L 63/10; H04L 63/126; H04L 67/10; H04L 67/12
See application file for complete search history.

(56) References Cited

U.S. PATENT DOCUMENTS

| | | | |
|---|---|---|---|
| 7,251,624 B1 | 7/2007 | Lee et al. | |
| 7,356,516 B2 | 4/2008 | Richey et al. | |
| 8,332,310 B2 | 12/2012 | Royer et al. | |
| 8,346,638 B2 | 1/2013 | Phillips et al. | |
| 8,892,468 B1 | 11/2014 | Litle | |
| 9,063,978 B1 | 6/2015 | Kapoor et al. | |
| 9,691,085 B2 | 6/2017 | Scheidelman | |
| 10,572,880 B2 | 2/2020 | Stopic et al. | |
| 2005/0185661 A1* | 8/2005 | Scott | H04L 67/02 370/401 |
| 2005/0241773 A1 | 11/2005 | Schneider et al. | |
| 2007/0014307 A1* | 1/2007 | Srinivasan | H04L 51/214 370/466 |
| 2010/0114774 A1 | 5/2010 | Linaman et al. | |
| 2011/0123773 A1 | 5/2011 | Lofink et al. | |
| 2011/0196791 A1 | 8/2011 | Dominguez | |
| 2011/0246357 A1 | 10/2011 | Young et al. | |
| 2011/0276475 A1 | 11/2011 | Godejohn et al. | |
| 2014/0006264 A1 | 1/2014 | Powell et al. | |
| 2014/0095393 A1 | 4/2014 | Nightengale et al. | |
| 2015/0012430 A1 | 1/2015 | Chisholm et al. | |
| 2016/0379216 A1 | 12/2016 | Wang et al. | |
| 2025/0068989 A1* | 2/2025 | Shapira | G06Q 10/063 |

* cited by examiner

602  RECEIVE TRANSACTION DISPUTE FROM ISSUER PORTAL

604  ANALYZE DISPUTE DATA

606  DESIGNATE DISPUTE AS CHARGEBACK OR PRE-CHARGEBACK

608  TRANSMIT PRE-CHARGEBACKS TO MERCHANT PORTAL

610  TRANSMIT CHARGEBACKS TO PAYMENT PROCESSOR

600

COMMUNICATION NETWORK AND METHOD FOR ROUTING DATA MESSAGES ON NETWORKS HAVING DIFFERENT COMMUNICATION PROTOCOLS

CROSS REFERENCE TO RELATED APPLICATION

This application is a continuation of, and claims priority to, U.S. patent application Ser. No. 15/593,008, filed May 11, 2017, which claims the benefit of U.S. Provisional Patent Application No. 62/335,369, filed on May 12, 2016, the contents of which are hereby incorporated by reference in their entirety.

BACKGROUND

The present application relates generally to communication networks and, more particularly, to a network-based system and method for routing data messages on networks having different communication protocols.

When a cardholder uses a payment card (e.g., a credit card or a debit card) to initiate a transaction to purchase goods or services from a merchant, an acquiring bank (i.e., the merchant's bank) will typically reimburse the merchant for the transaction. The acquiring bank will then settle those funds with an issuing bank of the account corresponding to the payment card by presenting transaction data, associated with the transaction, to a payment processor. In a process known as clearing, transaction data is communicated from the acquiring bank through the payment processor to the issuing bank. After clearing, settlement of the final payment occurs via the payment processor. Settlement is a process used to exchange funds between the acquiring bank and the issuing bank for the net value of a batch of all monetary transactions that have cleared for that processing day.

On occasion, the cardholder may be unsatisfied with the goods or services provided by the merchant, may not recognize the purchase, may determine the purchase is fraudulent, or may otherwise dispute the transaction. In these examples, the user may initiate a transaction dispute, known as a chargeback, with the issuing bank. The chargeback may be used to return some or all of the funds associated with the disputed transaction to the account corresponding to the payment card. Theses chargeback disputes are also processed over the payment network. Typically, the issuing bank immediately issues a credit to the account for the amount of the transaction. The issuing bank then sends a chargeback request to an issuing bank processor, and the request is collected with other requests and submitted in a batch to the payment processor. The chargeback request is then sent to the acquiring bank or an acquirer processor. However, the merchant may dispute the chargeback with the assistance of the acquiring bank. The issuing hank and the acquiring bank may then attempt to mediate the charge through an arbitration proceeding. Depending on the outcome, the cardholder, the issuing bank, the acquiring bank, or the merchant may be left with the cost of the transaction.

The chargeback process is complicated, time consuming, and/or costly to all participants involved. Each chargeback transmitted through the payment processor and over the payment network consumes network resources and bandwidth.

However, some transaction disputes could be resolved between the cardholder and the merchant without a chargeback request. Unfortunately, a system that allows cardholders to communicate directly with a merchant regarding questionable transactions does not exist. Rather, the cardholder is only given the option of submitting a chargeback. Accordingly, it is desirable to have a system that allows a cardholder to submit a dispute, the system including a communication network linking a cardholder with a merchant to resolve at least some disputes without having to use payment processor resources.

BRIEF DESCRIPTION

In one aspect, a computer system including a first network-based portal, a second network-based portal, and an analyzer computing device is provided. The first network-based portal is configured to receive a plurality of data messages each comprising a plurality of data elements. The second network-based portal is configured to receive the plurality of data messages from the first network-based portal via a first network communication link. The analyzer computing device is in communication with the first network-based portal and the second network-based portal via the first network communication link. The analyzer computing device is in further communication with a processing computing device via a second network communication link separate from the first network communication link. The analyzer computing device includes at least one processor and at least one memory device, where the at least one processor is configured to: (i) receive, from the first network-based portal via the first network communication link, an initial data message including one or more of the plurality of data elements, (ii) analyze, using machine learning tools, the one or more data elements of the initial data message to determine whether to route the initial data message to the second network-based portal via the first network communication link or to the processing computing device via the second network communication link, the first network communication link and the second network communication link having different communication protocols, (iii) in response to determining to route the initial data message to the second network-based portal, route the initial data message to the second network-based portal via the first network communication link, and establish direct communication between the second network-based portal and the first network-based portal such that subsequent data messages associated with the initial data message are exchanged between the second network-based portal and the first network-based portal, and (iv) in response to determining to route the initial data message to the processing computing device via the second network communication link, reformat the initial data message into a different protocol compatible with the second network communication link, and transmit the reformatted initial data message to the processing computing device.

In another aspect, a computer-implemented method implemented using a computer system is provided. The computer system includes a first network-based portal, a second network-based portal, and an analyzer computing device is provided. The first network-based portal is configured to receive a plurality of data messages each comprising a plurality of data elements. The second network-based portal is configured to receive the plurality of data messages from the first network-based portal via a first network communication link. The analyzer computing device is in communication with the first network-based portal and the second network-based portal via the first network communication link. The analyzer computing device is in further communication with a processing computing device via a second network communication link separate from the first network communication link. The analyzer computing device includes at least one processor and at least one memory device. The method includes: (i) receiving, by the at least one processor, from the first network-based portal via the first network communication link, an initial data message including one or more of the plurality of data elements, (ii) analyzing, by the at least one processor using machine learning tools, the one or more data elements of the initial data message to determine whether to route the initial data message to the second network-based portal via the first network communication link or to the processing computing device via the second network communication link, the first network communication link and the second network communication link having different communication protocols, (iii) in response to determining to route the initial data message to the second network-based portal, routing, by the at least one processor, the initial data message to the second network-based portal via the first network communication link, and establishing, by the at least one processor, direct communication between the second network-based portal and the first network-based portal such that subsequent data messages associated with the initial data message are exchanged between the second network-based portal and the first network-based portal, and (iv) in response to determining to route the initial data message to the processing computing device via the second network communication link, reformatting, by the at least one processor, the initial data message into a different protocol compatible with the second network communication link, and transmitting, by the at least one processor, the reformatted initial data message to the processing computing device.

In yet another aspect, a non-transitory computer readable medium that includes computer-executable instructions is provided. When the computer-executable instructions are executed by at least one processor of a computer system including a first network-based portal configured to receive a plurality of data messages each comprising a plurality of data elements, a second network-based portal configured to receive the plurality of data messages from the first network-based portal via a first network communication link, and an analyzer computing device in communication with the first network-based portal and the second network-based portal via the first network communication link, where the analyzer computing device is in further communication with a processing computing device via a second network communication link separate from the first network communication link, and where the analyzer computing device includes the at least one processor and at least one memory device, the computer-executable instructions cause the at least one processor to: (i) (i) receive, from the first network-based portal via the first network communication link, an initial data message including one or more of the plurality of data elements, (ii) analyze, using machine learning tools, the one or more data elements of the initial data message to determine whether to route the initial data message to the second network-based portal via the first network communication link or to the processing computing device via the second network communication link, the first network communication link and the second network communication link having different communication protocols, (iii) in response to determining to route the initial data message to the second network-based portal, route the initial data message to the second network-based portal via the first network communication link, and establish direct communication between the second network-based portal and the first network-based portal such that subsequent data messages associated with the initial data message are exchanged between the second network-based portal and the first network-based portal, and (iv) in response to determining to route the initial data message to the processing computing device via the second network communication link, reformat the initial data message into a different protocol compatible with the second network communication link, and transmit the reformatted initial data message to the processing computing device.

BRIEF DESCRIPTION OF THE DRAWINGS

FIG. 1 is a schematic diagram illustrating an exemplary multi-party payment network system for processing payment card transactions.

FIG. 2 is a schematic diagram illustrating an exemplary multi-party network system for processing payment card chargebacks.

FIG. 3 is a schematic diagram illustrating an exemplary computer system that includes a dispute analyzer (DA) computing device for designating transaction disputes as either chargeback disputes or pre-chargeback disputes.

FIG. 4 is a data flow diagram illustrating an example method of a pre-chargeback dispute resolution using the DA computing device, as shown in FIG. 3.

FIG. 5 is a schematic diagram of an example server computing device that may be used with the computer system shown in FIG. 3.

FIG. 6 is flowchart of an example process for designating a transaction dispute as either a chargeback dispute or pre-chargeback dispute.

DETAILED DESCRIPTION

Figure 1:
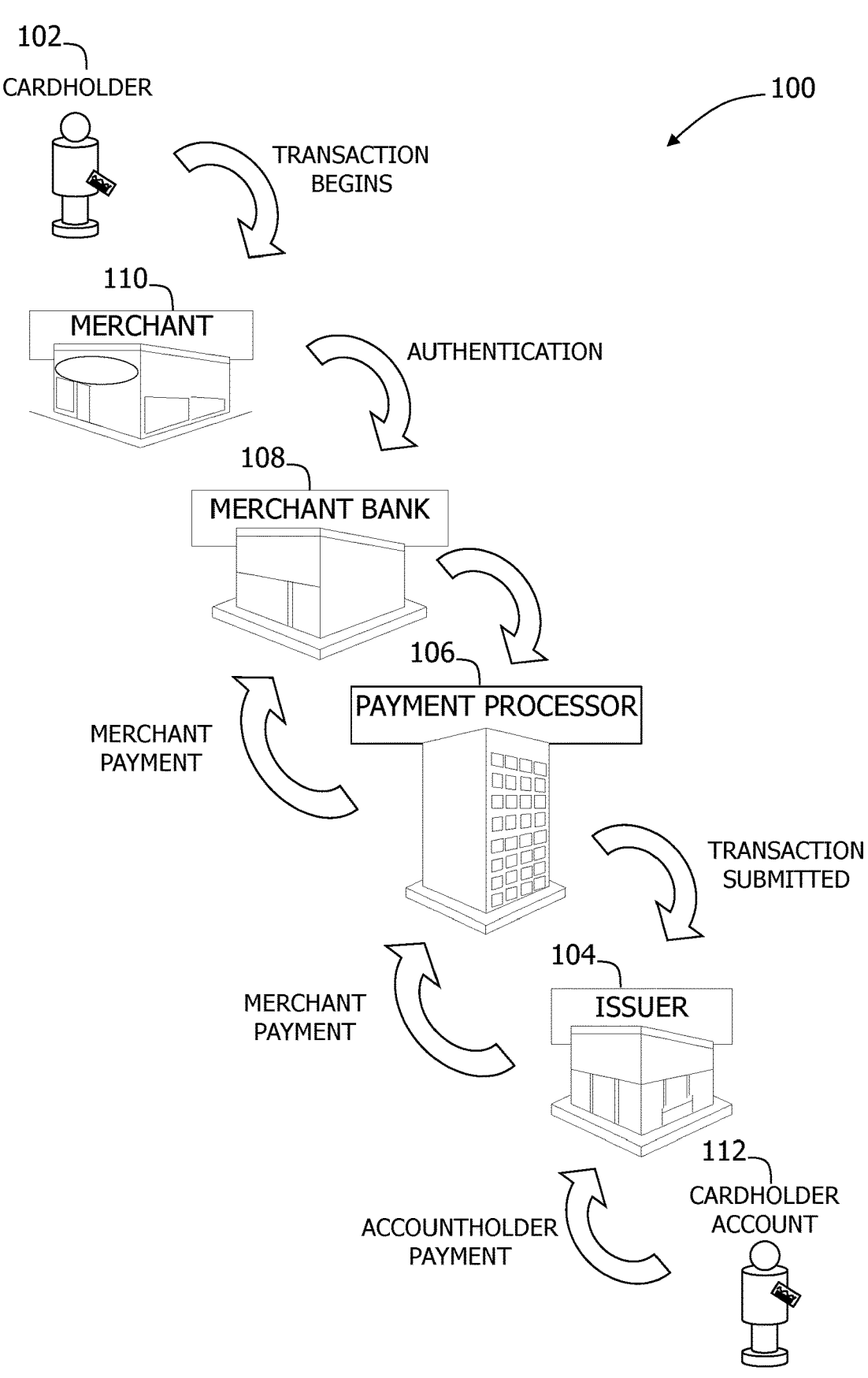
FIGS. 1-6 show example embodiments of the methods and systems described herein.

Described herein is a network-based system and method for routing data messages on networks having different communication protocols. The network-based system may be implemented as a transaction dispute communication system that links cardholders with merchants for resolving transaction disputes between said parties. This "pre-charge-back system" enables resolution of transaction disputes before or without submitting the transaction disputes over a payment network as chargebacks. Therefore, the pre-charge-back system reduces traffic processed by the payment network by providing a network communication link between said parties for addressing these pre-chargebacks.

The pre-chargeback system enables resolution of transaction disputes between cardholders, issuers (e.g., issuing banks), and merchants, to avoid submitting chargebacks to the payment network. The pre-chargeback system includes at least a transaction dispute analyzer (DA) computing device, an issuer portal, a merchant portal, and a pre-chargeback network including one or more communication channels or links. The DA computing device includes at least one processor in communication with a memory. The DA computing device is in communication with the issuer portal and the merchant portal and is configured to exchange one or more messages between these portals, or a cardholder and a merchant, to facilitate resolving a transaction dispute. A "pre-chargeback," as used herein, is defined as a dispute or question raised by the cardholder with respect to a payment transaction. For example, a cardholder may identify an incorrect transaction amount, or may not recognize the merchant based on the payment transaction data. Such a dispute may be resolved by the merchant without having to submit the dispute in question through the chargeback process. In some cases, if a pre-chargeback cannot be resolved through the pre-chargeback system, the pre-charge-back may then be submitted as a chargeback through the payment network.

The issuer portal is communicatively coupled to the DA computing device over a first network connection. The merchant portal is communicatively coupled to the DA computing device over a second network connection. The first and/or second network connection may include, for example, a local area network (LAN) or a wide area network (WAN), dial-in-connections, cable modems, and special high-speed Integrated Services Digital Network (ISDN) lines. In some embodiments, the issuer portal and/or the merchant portal may be communicatively coupled to a payment processor. In one embodiment, the DA computing device is in communication with or is a part of the payment processor. In another embodiment, the DA computing device is integrated with the issuer server. In some embodiments, the DA computing device functions as a router and provides a number of network interfaces. Each network interface may be associated with IP address information (e.g., interface IP address and subnet) to enable the exchange of data. Routers are well known to those of ordinary skill in the art and will not be further described except as to how they relate to embodiments of the disclosure.

In one example embodiment, a cardholder, using an internet-enabled user computing device (such as a mobile phone, smartphone, personal digital assistants (PDA), desktop computer, or laptop computer) accesses a controlled-access issuer portal associated with an issuing bank. The issuer portal may be a website/webpage, a series of websites/webpages, a web application, or a mobile application connected to an issuer server. The cardholder accesses the issuer portal to view an online banking account associated with a payment card issued by the issuing bank and assigned to the cardholder. The payment card is used to initiate a payment for goods or services to a merchant. The cardholder may be required to enter information such as login information into the issuer portal to interact with the issuer portal and view the online banking account. The online banking account may include a transaction history associated with the payment card.

The cardholder uses the issuer portal to review the transaction history associated with the payment card. The issuer portal further includes one or more features enabling the cardholder to dispute a transaction listed in the transaction history. For example, the cardholder can select a transaction to dispute. This dispute will either be processed through the pre-chargeback network as a pre-chargeback or through the payment network as a chargeback. The issuer portal may provide one or more features within a user interface that enable the cardholder to select a transaction to dispute, such as a button or checkbox. The issuer portal may additionally provide one or more features that enable the cardholder to indicate a reason for the dispute, such as a drop-down menu, a multiple-choice list, and/or a text entry field. The cardholder may, for example, dispute the transaction because the cardholder is unsatisfied with goods or services provided by the merchant, the cardholder does not recognize a purchase, the cardholder believes that a transaction amount is wrong, and/or the cardholder determines a purchase is fraudulent. Information associated with the selected transaction for dispute, including the cardholder-provided data regarding the reason(s) for the dispute, is referred to herein as "cardholder dispute data".

The issuer portal may further include one or more messaging sections to receive and display messages to the cardholder. For example, the messages may be in the form of electronic messages (e.g., e-mails or instant messages) from one or more merchants and/or the issuer. The cardholder is able to view and respond to the messages within the one or more messaging sections.

After selecting a transaction to dispute from the issuer portal and providing the cardholder dispute data, the cardholder uses the issuer portal to submit the dispute (e.g., by selecting a "submit" option). The issuer portal retrieves transaction data associated with the disputed transaction and generates a dispute message including the transaction data and the cardholder dispute data. The associated transaction data includes, but is not limited to, a primary account number (PAN) associated with a payment card used to initiate the transaction, account profile data for the PAN, a merchant identifier (ID), an acquiring bank identifier, an issuing bank ID, an original transaction amount, a transaction date and time, a merchant location ID, a card product type, a merchant category code, an authorization code, and/or other transaction identifiers that may be used to identify the merchant and/or the disputed transaction. The issuer portal may generate a dispute identifier associated with the dispute and include the dispute ID within the dispute message. The issuer portal may further generate a reason code associated with the cardholder provided reason for the dispute, wherein the reason code is a particularly formatted data element configured to easily communicate the reason for the dispute the merchant. The dispute message is transmitted by the issuer server to the DA computing device.

The DA computing device receives the dispute message. In the example embodiment, the DA computing device is configured to analyze the dispute message and determine whether to transmit the dispute message through the payment network (e.g., to the payment processor) for the normal chargeback process or through the pre-chargeback network for potential resolution. In some embodiments, the issuer portal and/or a cardholder statement indicate that a pre-chargeback is in pending status and under review.

The DA computing device may use natural language processing, and/or statistical methods, and/or other machine learning methods to analyze the dispute data to determine where to route the dispute message. For example, in one embodiment, the DA computing device may identify particular data ("indicators") that are historically associated with disputed transactions that have been resolved by pre-chargeback network communication between a merchant and a cardholder. For example, cardholders that dispute transactions because they don't recognize the merchant associated with the transaction may include the phrase "don't recognize" in the cardholder dispute data. If such disputes are often resolved by pre-chargeback network communication between the merchant and the cardholder, the DA computing device may learn to associate the phrase "don't recognize" with a high probability of pre-chargeback resolution and route applicable dispute messages through the pre-chargeback network for potential resolution. These indicators may be stored in a database associated with the DA computing device. In some embodiments, the DA computing device also uses keywords or indicators from the dispute message to determine how to route the dispute message.

In another embodiment, the issuer portal enables the cardholder to choose whether to submit the transaction dispute directly through the normal chargeback process or to the merchant via the pre-chargeback system for transaction dispute resolution. In such an embodiment, the issuer imbeds an indicator of the cardholder submission selection into the dispute message as part of the cardholder dispute data, and the DA computing device identifies the indicator of the cardholder selection upon processing the cardholder dispute data embedded within the dispute message. If the cardholder chooses to submit the dispute directly through the normal chargeback process, the DA computing device transmits the dispute message to the payment processor as a chargeback message. In an alternative embodiment, the issuer portal is in direct communication with the payment processor and transmits the dispute message as a chargeback message directly to the payment processor without using the DA computing device. Alternatively, if the cardholder chooses to submit the dispute to the merchant as a pre-chargeback, the issuer portal transmits the dispute message to the DA computing device. The DA computing device then transmits the dispute message to the merchant portal associated with the merchant identified in the dispute message as a pre-chargeback message. The merchant accesses the merchant portal to access and respond to the pre-chargeback message, as described below.

In still another embodiment, the issuer server itself determines whether to enable the cardholder to communicate directly with the merchant using the pre-chargeback network. For example, the issuer portal may include a pop-up browser enabling the cardholder to transmit the dispute message to the DA computing device for pre-chargeback resolution.

Upon receiving a dispute message and determining the dispute message is to be routed through the pre-chargeback network as a pre-chargeback message, the DA computing device transmits the pre-chargeback message to a merchant server. In one embodiment, the DA computing device is configured to use the dispute message, particularly the associated transaction data, to determine the merchant associated with the pre-chargeback message. In some embodiments, each merchant has a separate merchant portal. In such embodiments, the DA computing device determines the particular merchant server that provides the merchant portal for the identified merchant. The DA computing device transmits the pre-chargeback message to that merchant server. In an alternative embodiment, all merchants share a merchant portal, but each merchant has a separate messaging section to display, receive, and transmit message communications. In such embodiments, the DA computing device transmits the pre-chargeback message to a central merchant server that provides a merchant portal.

The merchant portal displays the pre-chargeback message, including at least some of the cardholder dispute data, enabling the merchant to review new pre-chargebacks and updates to existing pre-chargebacks. The merchant portal can be a website/webpage, a series of websites/webpages, a web application, or a mobile application. The merchant portal further includes one or more messaging sections to display one or more received messages (such as text message communications, electronic mail (i.e., emails), and/or other information) relating to one or more pre-chargebacks. The merchant then reviews the pre-chargeback messages and provides a pre-chargeback response message. The response may include, for example, querying the cardholder for additional detail and/or providing store credit with the merchant to the cardholder.

In some embodiments, the merchant portal is part of and/or is hosted by the DA computing device and accessible to merchants. In alternative embodiments, a separate computing device (e.g., a merchant portal) hosts the merchant portal(s).

The merchant can also respond to the cardholder by using the one or more messaging sections to create and transmit a pre-chargeback response message through the pre-chargeback network (e.g., the second communication link) to the DA computing device. The DA computing device is configured to then transmit the pre-chargeback response message to the issuer portal. In some embodiments, the cardholder is notified of the pre-chargeback response message. For example, a visual queue appears in the issuer portal or on a cardholder statement. In some embodiments, the cardholder is notified of the pre-chargeback response message via their preferred method of contact provided by the cardholder to the issuer (e.g., mobile phone prompt/text message, email, telephone call, etc.).

The cardholder may use the issuer portal to respond to the pre-chargeback response message to continue the pre-chargeback resolution process. The cardholder may agree to a resolution proposed by the merchant in the pre-chargeback response message. Alternatively, the cardholder and the merchant can continue to exchange messages using the above-described process.

In some embodiments, the merchant may choose to respond to the pre-chargeback message by submitting the dispute to the payment network for processing through the normal chargeback process. For example, the merchant may receive the pre-chargeback message and decide that the pre-chargeback is more appropriate for the chargeback process. In one embodiment, the merchant notifies the DA computing device to submit the pre-chargeback to the payment processor. In another embodiment, the merchant is in direct communication with the payment processor or in direct communication with the acquirer and can begin the chargeback process without the DA computing device.

The technical effects achieved by the systems and methods described herein include providing a new communication network (a "pre-chargeback network") between consumers (e.g., cardholders and issuing banks) and merchants for resolving transaction disputes between the parties prior to or without submitting the disputed transactions as chargebacks through the payment processor. The pre-chargeback system described herein enables consumers and merchants to more easily resolve these disputes by enabling the parties to communicate directly, submit questions, ask for more information, etc. The pre-chargeback system facilitates reducing the number of chargebacks submitted to the payment processor, freeing up network resources and bandwidth for processing payments and increasing a speed of the payment processor. In turn, the payment network may experience more accurate data processing and less network traffic from chargebacks. In addition, reducing the number of chargebacks may lead to reducing a number of issuer declines.

The methods and systems described herein may be implemented using computer programming or engineering techniques including computer software, firmware, hardware or any combination or subset thereof, wherein the technical effect may be achieved by performing at least one of the following steps: (a) receiving, at a DA (dispute analyzer) computing device, a dispute message from an issuer portal containing dispute data associated with a transaction dispute; (b) determining whether to designate the transaction dispute described in the dispute message as either a pre-chargeback or a chargeback; (c) transmitting chargebacks to a payment processor; (d) transmitting pre-chargebacks to a merchant challenge portal; (e) receiving at a DA computing device, a pre-chargeback response message from the merchant portal; and (e) transmitting the pre-chargeback response message to the issuer portal.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of AT&T located in New York, New York). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

The following detailed description illustrates embodiments of the disclosure by way of example and not by way of limitation. It is contemplated that the disclosure has general application to providing a pre-chargeback system to resolve transaction disputes between cardholders and merchants, thus providing an alternative to the chargeback process.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PCAs), and key fobs.

FIG. 1 is a schematic diagram illustrating an exemplary multi-party payment card processing system 100 for processing and disputing payment-by-card transactions. The present system and method relate to payment card processing system 100, such as a credit card payment network using the Mastercard® payment processor 106. Mastercard® payment processor 106 is a proprietary communications standard promulgated by Mastercard International Incorporated® for the exchange of financial transaction data between financial institutions that are registered with Mastercard International Incorporated®. (Mastercard is a registered trademark of Mastercard International Incorporated located in Purchase, New York).

In payment card processing system 100, a financial institution, such as an issuing bank 104, issues a payment card, such as a credit card account or a debit card account, to a cardholder 102, who uses the payment card to tender payment for a purchase from a merchant 110. To accept payment with the payment card, merchant 110 must normally establish an account with a financial institution that is part of the financial payment system. This financial institution is usually called the "merchant bank" or the "acquiring bank" or simply "acquirer". When a cardholder 102 tenders payment for a purchase with a payment card (also known as a financial transaction card), merchant 110 requests authorization from merchant bank 108 for the amount of the purchase. The request may be performed over the telephone or via a website, but is oftentimes performed through the use of a point-of-sale terminal, which reads the cardholder's account information from the magnetic stripe on the payment card and communicates electronically with the transaction processing computers of merchant bank 108. Alternatively, merchant bank 108 may authorize a third party to perform transaction processing on its behalf. In this case, the point-of-sale terminal will be configured to communicate with the third party. Such a third party is usually called a "merchant processor" or an "acquiring processor."

Using payment processor 106, the computers of merchant bank 108 or the merchant processor will communicate with the computers of issuing bank 104 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by Mastercard International Incorporated®, an authorization code, and/or other transaction identifiers that may be used to identify the transaction.

During the authorization process of the payment card system, the clearing process is also taking place. During the clearing process, merchant bank 108 provides issuing bank 104 with information relating to the sale. No money is exchanged during clearing. Clearing (also referred to as "first presentment") involves the exchange of data required to identify the cardholder's account 112 such as the account number, expiration date, billing address, amount of the sale, and/or other transaction identifiers that may be used to identify the transaction. Along with this data, banks in the United States also include a bank network reference number, such as the Banknet Reference Number used by Mastercard International Incorporated®, which identifies that specific transaction. When the issuing bank 104 receives this data, it posts the amount of sale as a draw against the cardholder's 102 available credit and prepares to send payment to the merchant bank 108.

When a request for authorization is accepted, the available credit line or available account balance of cardholder's account 112 is decreased. Normally, a charge is not posted immediately to a cardholder's account 112 because bankcard associations, such as Mastercard International Incorporated®, have promulgated rules that do not allow a merchant to charge, or "capture," a transaction until goods are shipped or services are delivered. When a merchant 110 ships or delivers the goods or services, merchant 110 captures the transaction by, for example, appropriate data entry procedures on the point-of-sale terminal. If a cardholder 102 cancels a transaction before it is captured, a "void" is generated. If a cardholder 102 returns goods after the transaction has been captured, a "credit" is generated.

After a transaction is captured, the transaction is settled between merchant 110, merchant bank 108, and issuing bank 104. Settlement refers to the transfer of financial data or funds between the merchant's account, merchant bank 108, and issuing bank 104 related to the transaction. Usually, transactions are captured and accumulated into a "batch," which is settled as a group.

Figure 2:
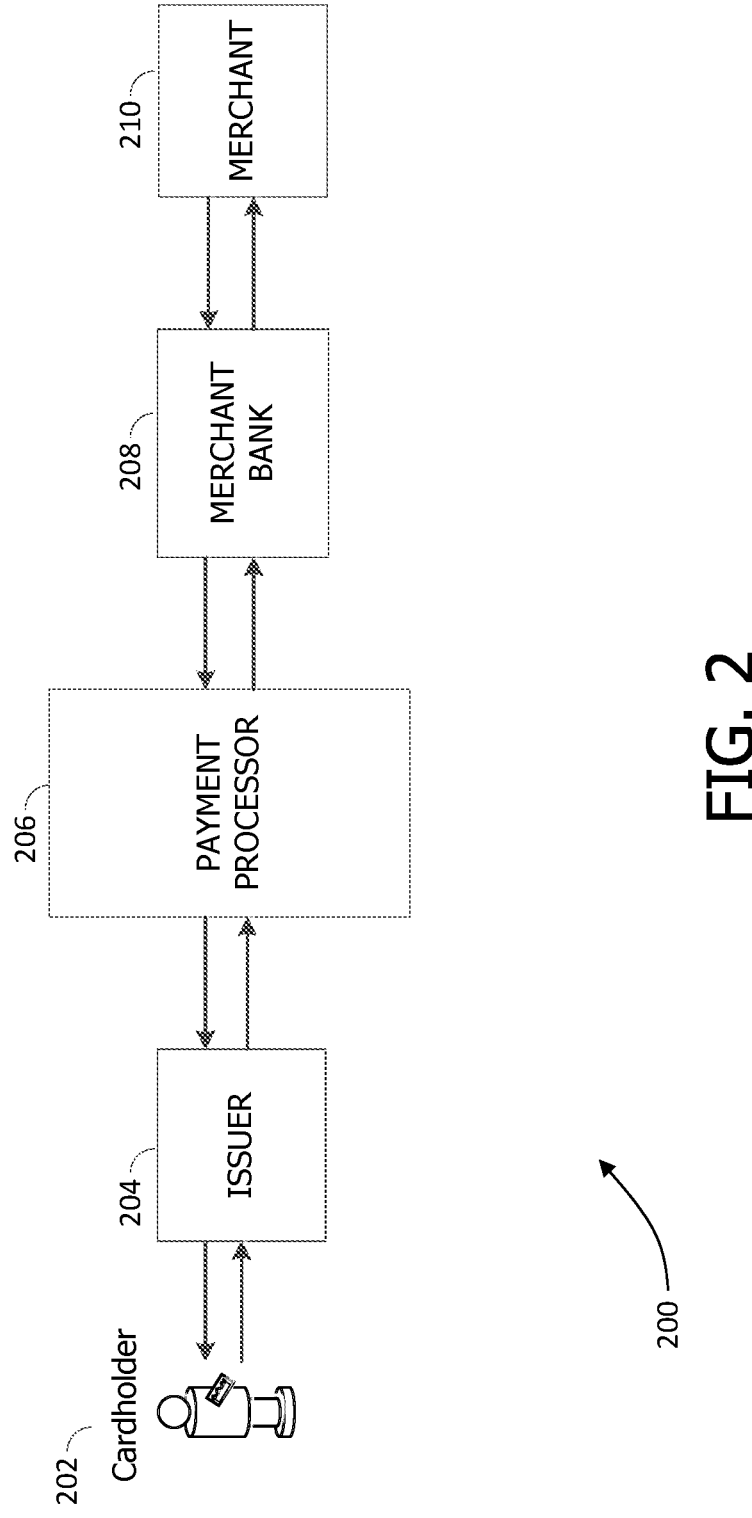

FIG. 2 is a schematic diagram illustrating an exemplary multi-party network system 200 for processing payment card chargebacks. In one embodiment, system 200 is similar to or the same as system 100 as shown in FIG. 1. In some cases, cardholder 202 disputes a transaction that may have been carried out using payment card system 200. A transaction dispute may occur for technical reasons such as insufficient funds, clerical reasons such as duplicate billing and/or incorrect amount billed, quality reasons such as when a cardholder claims to have never received the goods as promised, and/or fraud reasons where a cardholder did not authorize the purchase. A transaction dispute may become a chargeback.

To initiate a chargeback, cardholder 202 may contact issuing bank 204 to dispute a transaction. Issuing bank 204 submits a chargeback transaction to payment processor 206, which provides clearing and settlement services to its registered users. Payment processor 206 may be the same or similar to the payment processor 106 described in FIG. 1. Payment processor 206 submits the chargeback to merchant bank 208. Merchant bank 208 either resolves the dispute or forwards it to merchant 210. Merchant 210 either accepts the chargeback or re-presents it back to merchant bank 208. If merchant 210 accepts the chargeback, merchant bank 208 forwards the response back to payment processor 206. Payment processor 206 then settles the chargeback with issuing bank 204. If merchant 210 re-presents the chargeback, merchant bank 208 rejects the chargeback requested by issuing bank 204. Merchant bank 208 may provide additional proof or documentation that the transaction was valid. Based on the second presentment, issuing bank 204 either accepts it and takes no further action, or rejects the second presentment, which is a stage referred to as arbitration chargeback. Once arbitration chargeback occurs, neither issuing bank 204 nor merchant bank 208 may initiate any additional chargebacks or presentments. At this point, a case filing is automatically generated with payment processor 206, which issues a financial liability decision regarding the chargeback.

Figure 3:
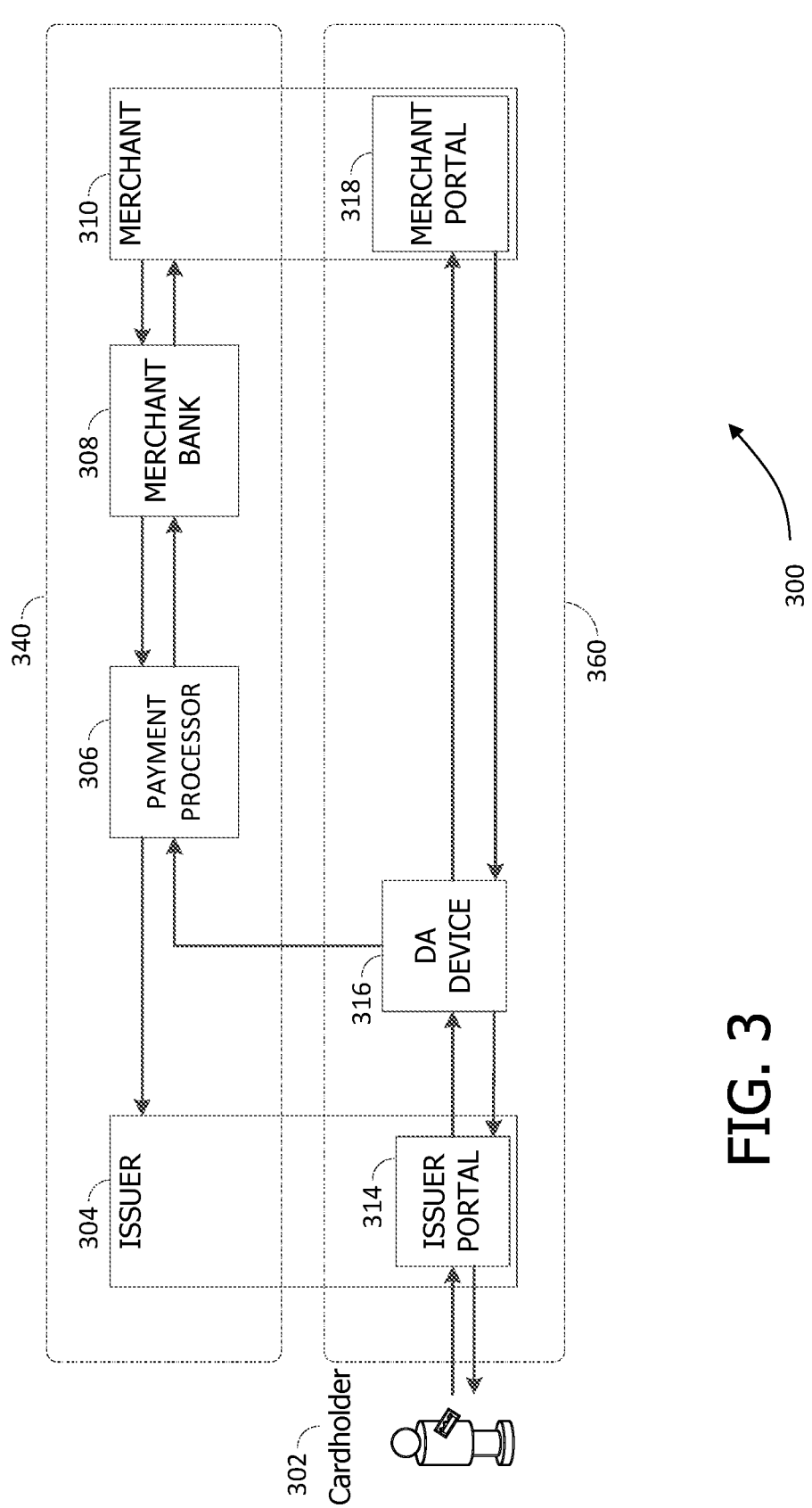

FIG. 3 is a schematic diagram illustrating an exemplary multi-party network system 300 that includes a dispute analyzer (DA) computing device 316 and a pre-chargeback communication network 360 for designating transaction disputes as either pre-chargebacks or chargebacks. FIG. 3 illustrates the handling of chargebacks and/or pre-chargebacks. Network system 300 includes a cardholder 302, an issuer 304, a payment processor 306, a merchant bank 308, a merchant 310, an issuer portal 314, DA computing device 316, and a merchant portal 318. According to an example embodiment, rather than initiate a chargeback using the procedure described with respect to FIG. 2, a cardholder 302 is able to communicate with merchant 310 using DA computing device 316, as described in FIG. 3. A network 340 is part of a chargeback system that may be similar to the chargeback system 200 described with respect to FIG. 2. Network 360 is a pre-chargeback network that may be used to resolve transaction disputes designated as pre-chargebacks. Network 340 and network 360 are two separate communication networks that are configured to run independently of one another.

Cardholder 302 accesses issuer portal 314 to review a cardholder payment transaction history associated with a payment card. The transaction history includes one or more transactions made using the payment card. Cardholder 302 selects a transaction to dispute and transmits the dispute through issuer portal 314, Cardholder 302 may select a dispute button or a pre-chargeback button displayed on the user interface of issuer portal 314. Cardholder 302 may, for example, dispute the transaction because he or she is unsatisfied with the goods or services provided by merchant 310, may not recognize the purchase, and/or may determine the purchase is fraudulent.

Issuer portal 314 receives the dispute, including cardholder dispute data. This dispute data also includes transaction data associated with the transaction being disputed. Issuer portal 314 transmits a corresponding dispute message, containing both the cardholder dispute data and associated transaction data, to the DA computing device 316.

In one embodiment. DA computing device 316 analyzes the dispute message as described above to determine whether to transmit the dispute message to payment processor 306 as a chargeback message or to merchant portal 318 as a pre-chargeback message. In another embodiment, cardholder 30:2 is given an option in issuer portal 314 whether to transmit the dispute data to payment processor 306 as a chargeback message or to merchant portal 318 as a pre-chargeback message. In still another embodiment, issuer 304 determines whether to enable cardholder 30:2 to transmit the dispute data to payment processor 306 as a chargeback message or to merchant portal 318 as a pre-chargeback message.

If a pre-chargeback message is sent from DA computing device 316 to merchant portal 318, merchant 310 can use merchant portal 318 to view the pre-chargeback message. Merchant portal 318 displays at least one pre-chargeback message, including at least some of the dispute data, enabling merchant 310 to review new pre-chargeback message and updates to existing pre-chargebacks. Merchant 310 then reviews pre-chargeback message information and can provide a pre-chargeback response message. The response may include, for example, the merchant's intention to resolve the pre-chargeback and may include, for example, querying the cardholder for additional detail and/or providing store credit with the merchant to the cardholder.

The merchant's pre-chargeback response message may be sent to cardholder 302 through merchant portal 318 by transmitting the pre-chargeback response message through pre-chargeback network 360 to DA computing device 316. DA computing device 316 transmits the response message to issuer portal 314. In some embodiments, cardholder 302 is notified of the response message as described above.

Cardholder 302 can respond, via a messaging section in issuer portal 314, to the merchant's pre-chargeback response message using pre-chargeback network 360. The cardholder may agree to a resolution proposed by the merchant in the pre-chargeback response message. Alternatively, cardholder 302 and merchant 310 can continue to exchange messages using the above-described process.

Figure 4:
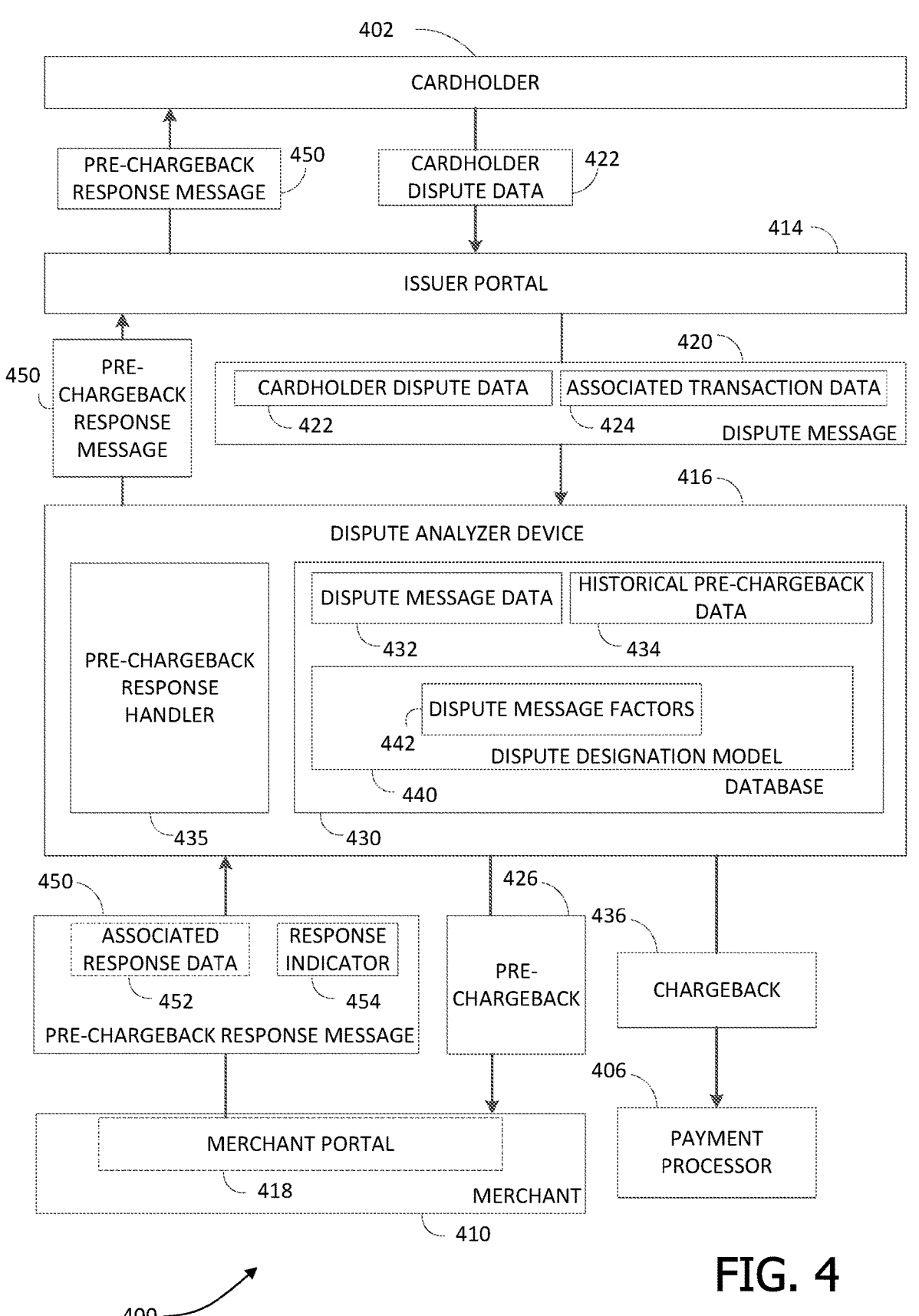

FIG. 4 is a data flow diagram 400 illustrating the flow of data between components of pre-chargeback network 360 described with respect to FIG. 3. FIG. 4 depicts the data flow between cardholder 402 and merchant 410. In the example embodiment, cardholder 402 and merchant 410 are the same or similar to cardholder 302 and merchant 310 respectively. The method further includes issuer portal 414, DA computing device 416, payment processor 406, merchant portal 418, and merchant 410. Issuer portal 414 receives cardholder dispute data 422 from cardholder 402, which may include one or more reasons for the transaction dispute, a narrative regarding the disputed transaction, chosen multiple choice options, etc. The issuer portal collects cardholder dispute data 422 with associated transaction data 424 to generate dispute message 420. Associated transaction data 424 includes, but is not limited to, a primary account number (PAN) associated with the payment card associated with the transaction, account profile data for the PAN, a merchant identifier (ID), an acquiring bank identifier, an issuing bank identifier, an original transaction amount, a transaction date and time, a merchant location ID, a card product type, a merchant category code, an authorization code, and/or other transaction identifiers that may be used to identify the merchant and/or the disputed transaction. The dispute message is transmitted by the issuer server to the DA computing device.

DA computing device 416 receives dispute message 420 from issuer portal 414. In an example embodiment, DA computing device extracts dispute message data 432 from dispute message 420 and stores it in database 430. Dispute message data 432 may include keywords or indicators from dispute message 420. Database 430 also includes historical pre-chargeback data 434 which may include indicators historically associated with transactions that have been resolved using the pre-chargeback system. Database 430 also includes dispute designation model 440, constructed using dispute message factors 442 and historical pre-chargeback data 434. Dispute message factors 442 may be determined using natural language processing, and/or statistical methods, and/or other machine learning methods applied to historical pre-chargeback data 434. In some embodiments, the dispute designation model 440 and dispute message factors 442 are determined by the issuer. DA computing device 416 may contain one or more dispute designation models 440 and one or more set of dispute message factors 442. In some embodiments, the DA computing device 416 associates each issuer portal 414 to at least one dispute designation model 440 and at least one set of dispute message factors 442.

In one embodiment, DA computing device 416 applies dispute designation model 440 to dispute message data 432 to designate the transaction dispute associated with dispute message 420 as either a chargeback or a pre-chargeback. If the dispute is designated a chargeback, DA computing device 416 submits a chargeback message 436 to payment processor 406 to initiate the chargeback process described with respect to FIG. 2. If the dispute is designated a pre-chargeback, DA computing device 416 transmits the pre-charge back message 426 to merchant portal 418 as described with respect to FIG. 3. The contents of dispute message 420 are contained, in whole or in part, within pre-chargeback message 426 submitted to merchant portal 418. In another embodiment (not shown), the cardholder determines whether to (i) transmit the cardholder dispute data 422 through DA computing device 416 to the payment processor 406 as a chargeback message, or (ii) transmit the cardholder dispute data 422 through DA computing device 416 to the merchant portal 418 as a pre-chargeback message. In such an embodiment, DA computing device 416 does not analyze cardholder dispute data 422. In still another embodiment (not shown), the issuer determines whether to (i) transmit the cardholder dispute data 422 through DA computing device 416 to the payment processor 406 as a chargeback message, or (ii) transmit the cardholder dispute data 422 through DA computing device 416 as a pre-chargeback message.

Upon receiving dispute message 420 and determining it is to be routed through the pre-chargeback network as a pre-chargeback message, DA computing device 416 transmits the pre-chargeback message 426 to a merchant server. In one embodiment, DA computing device 416 is configured to use dispute message 420, particularly associated transaction data 424, to determine the merchant 410 associated with the pre-chargeback. In some embodiments, each merchant 410 has a separate merchant portal 418. In such embodiments, DA computing device 416 determines the particular merchant server that provides the merchant portal 418 for the identified merchant 410. DA computing device 416 transmits the pre-chargeback message 426 to that merchant server. In an alternative embodiment, all merchants 410 share a merchant portal 418 but each merchant 410 has a separate messaging section to display, receive, and transmit message communications. In such embodiments, DA computing device 416 transmits pre-chargeback message 426 to a central merchant server that provides a merchant portal 418.

Merchant portal 418 displays at least one pre-chargeback message 426, including at least some of cardholder dispute data 422, enabling merchant 410 to review new pre-chargebacks and updates to existing pre-chargebacks. Merchant portal 418 can be a website/webpage, a series of websites/webpages, a web application, or a mobile application. Merchant portal 418 further includes one or more messaging sections to display one or more text message communications, electronic mail (i.e., emails), and/or other information relating to one or more pre-chargebacks. Merchant 410 then reviews pre-chargeback messages 426 and can provide a pre-chargeback response message 450. Pre-chargeback response message 450 can include, for example, associated response data 452 and a response indicator 454. Response indicator 454 may communicate that merchant 410 intends to resolve the pre-chargeback using the pre-chargeback system. Response indicator 454 may further communicate that a full or partial credit associated with the disputed transaction is being processed, provide store credit with merchant 410. Associated response data 452 may include one or more queries to cardholder 402 for additional detail.

Pre-chargeback response message 450 is transmitted by merchant portal 418 to DA computing device 416 where it is received by a pre-chargeback response handler 435. In one embodiment, pre-chargeback response handler 435 is configured to use data within pre-chargeback response message 450 to determine the issuer portal 414 to receive pre-chargeback response message 450. In some embodiments, cardholder 402 is notified of pre-chargeback response message 450 as described above.

Cardholder 402 can respond (not shown), via a messaging section in issuer portal 414, to pre-chargeback response message 450. In some embodiments, the cardholder's response can be transmitted through pre-chargeback response handler 435 to merchant portal 418. Cardholder 402 and merchant 410 can continue to exchange messages using the above-described process.

Figure 5:
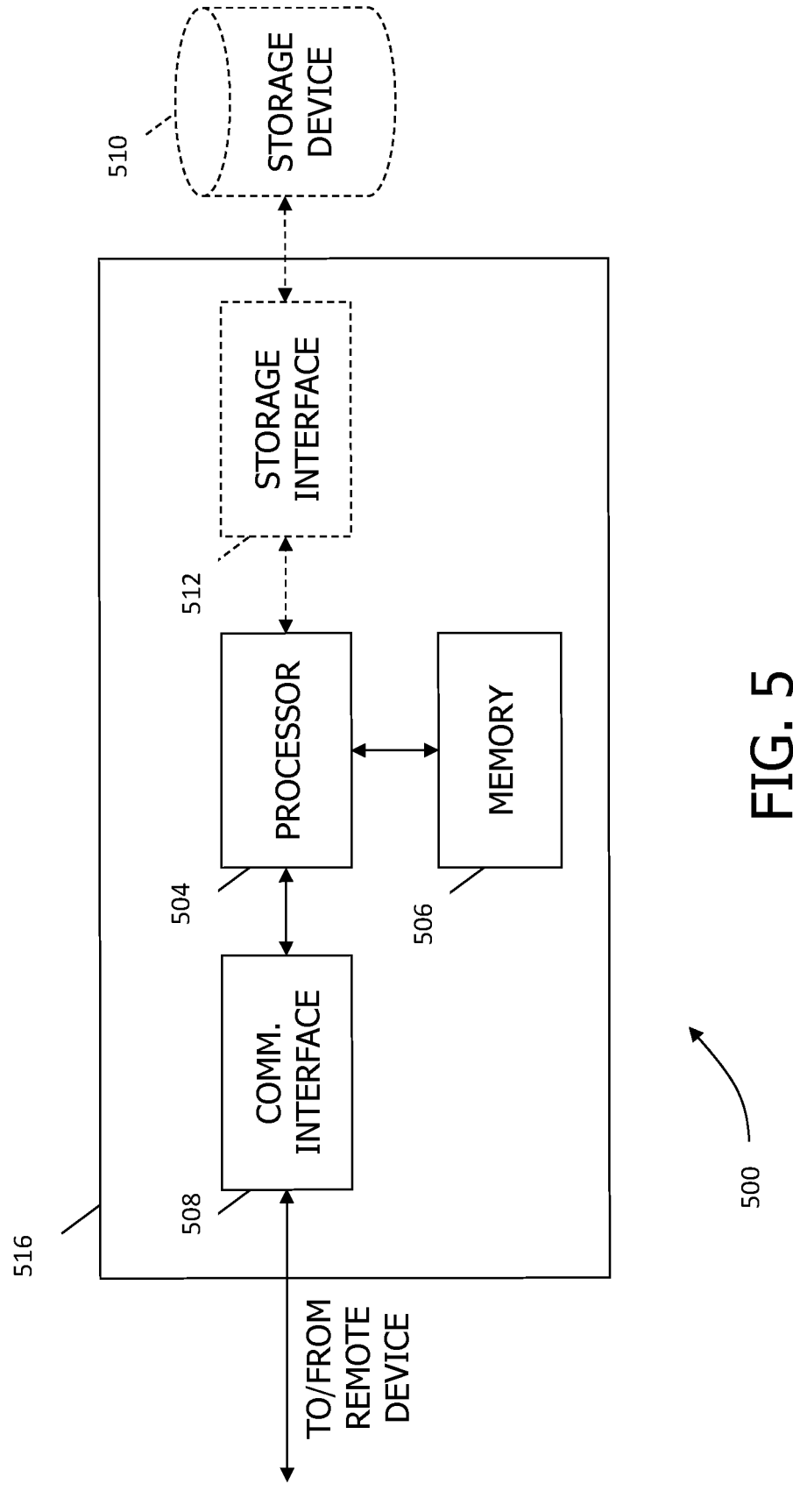

FIG. 5 illustrates an example configuration 500 of a DA computing device as shown in FIG. 4. DA computing device 516 includes a processor 504 for executing instructions. Instructions may be stored in a memory area 506, for example. Processor 504 may include one or more processing units (e.g., in a multi-core configuration).

Processor 504 is operatively coupled to a communication interface 508 such that DA computing device 516 is capable of communicating with a remote device such as a merchant portal, an issuing portal, or a payment processor. For example, communication interface 508 may transmit pre-chargeback data to the merchant portal and/or another client device via a network.

Processor 504 may also be operatively coupled to a storage device 510. Storage device 510 is any computer-operated hardware suitable for storing and/or retrieving data. In some embodiments, storage device 510 is integrated in DA computing device 516. For example, DA computing device 516 may include one or more hard disk drives as storage device 510. In other embodiments, storage device 510 is external to DA computing device 516 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
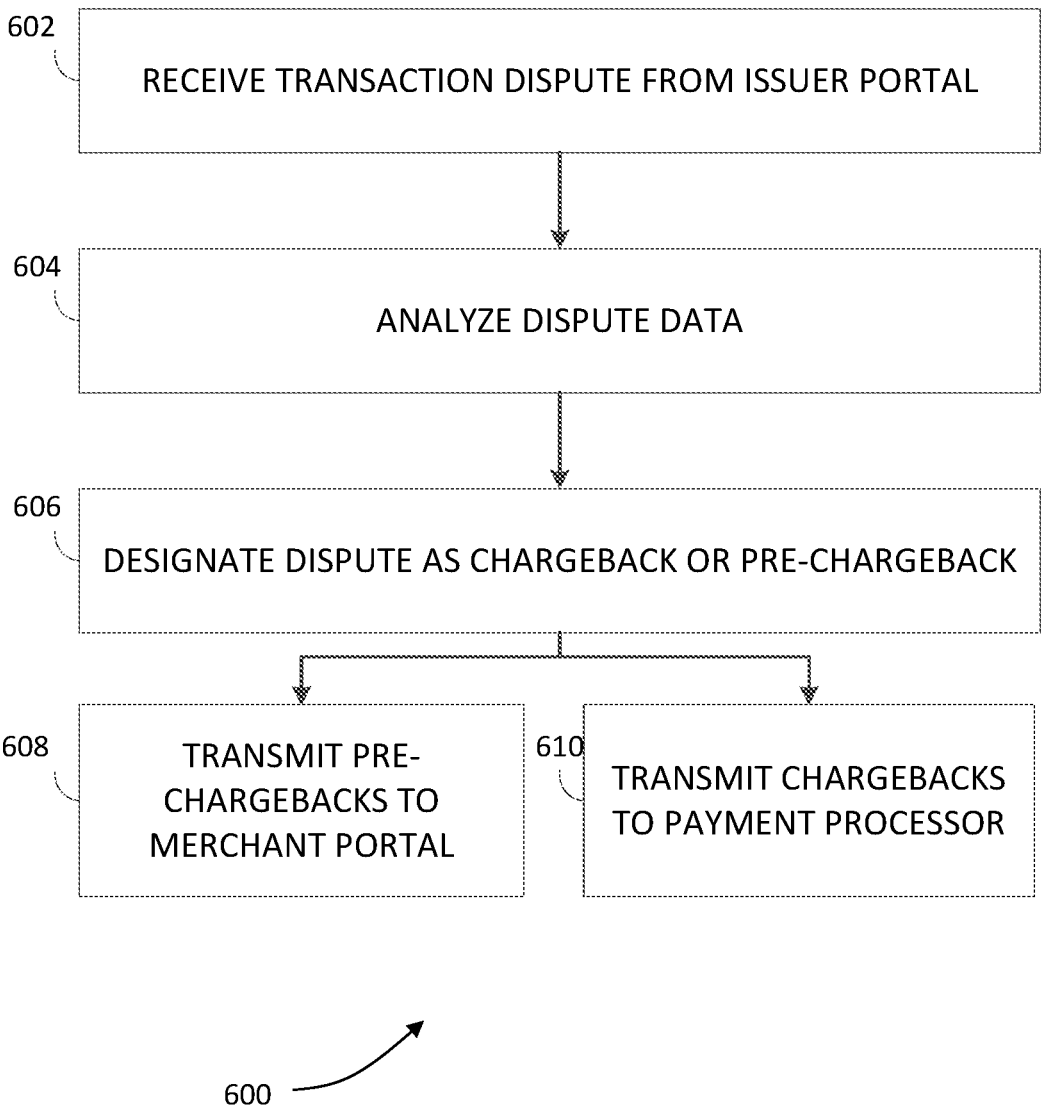

FIG. 6 is a flowchart of a method 600 for designating a transaction dispute as a pre-chargeback for transmission over a pre-chargeback network, such as network 360 (shown in FIG. 3). In the example embodiment, method 600 is performed by a DA computing device, such as DA computing device 316 (shown in FIG. 3). In certain embodiments, method 600 may at least be partially performed by a different computing device. In other embodiments, method 600 may include additional, fewer, or alternative actions, including those described herein.

In 602, the DA computing device receives a transaction dispute, including transaction dispute data, from an issuer portal. The dispute data may include, for example, a transaction amount, a merchant identification (ID), and a location of the merchant. In one embodiment, the DA computing device analyses 604 the dispute data as described above to designate 606 the transaction dispute as a chargeback or a pre-chargeback. The DA computing device transmits 608 pre-chargebacks to a merchant portal and transmits 610 chargebacks to a payment processor.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for determining the probability of an authorized transaction resulting in a chargeback. In this example, the computing device may include a memory device and a processor in communication with the memory device, and when executed by said processor the computer-executable instructions may cause the processor to perform a method such as the method described and illustrated in the example of FIG. 5.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system comprising:
   a first network-based portal configured to receive a plurality of data messages each comprising a plurality of data elements;
   a second network-based portal configured to receive the plurality of data messages from the first network-based portal;
   a first network communication link configured to exchange the plurality of data messages between the first network-based portal and the second network-based portal, the plurality of data messages formatted in a first protocol compatible with the first network communication link; and
   an analyzer computing device in communication with the first network-based portal and the second network-based portal via the first network communication link, the analyzer computing device in further communication with a processing computing device via a second network communication link separate from the first network communication link, the analyzer computing device comprising at least one processor and at least one memory device, the at least one processor of the analyzer computing device configured to:

receive, from the first network-based portal via the first network communication link, an initial data message including one or more of the plurality of data elements, the initial data message formatted in the first protocol;

train machine learning tools using a plurality of indicators associated with a plurality of historical messages, each of the plurality of historical messages routed to one of the first network communication link or the second network communication link;

analyze, using the trained machine learning tools, the one or more data elements of the initial data message to determine whether to route the initial data message to the second network-based portal via the first network communication link or to the processing computing device via the second network communication link, the first network communication link and the second network communication link having different communication protocols;

in response to determining to route the initial data message to the second network-based portal, route the initial data message to the second network-based portal via the first network communication link, and establish direct communication between the second network-based portal and the first network-based portal via the first network communication link, such that subsequent data messages associated with the initial data message are exchanged between the second network-based portal and the first network-based portal; and in response to determining to route the initial data message to the processing computing device via the second network communication link, reformat the initial data message into a second protocol compatible with the second network communication link, and transmit the reformatted initial data message to the processing computing device.

2. The computer system of claim 1, wherein the at least one processor is further configured to determine, using the one or more data elements of the initial data message, a particular server associated with the second network-based portal where to route the initial data message.

3. The computer system of claim 1, wherein routing the initial data message to the second network-based portal includes displaying the initial data message on the second network-based portal.

4. The computer system of claim 1, wherein the machine learning tools comprises at least one of natural language processing, statistical analysis, or machine learning analysis.

5. The computer system of claim 1, wherein the first network communication link comprises Internet-based communication protocols, and wherein the second network communication link comprises a proprietary communications standard promulgated by the second network communication link for exchange of specialized data messages.

6. The computer system of claim 1, wherein establishing the direct communication between the second network-based portal and the first network-based portal further includes exchanging the subsequent data messages until a resolution associated with the initial data message is achieved.

7. The computer system of claim 1, wherein the first network-based portal is associated with a first party, wherein the second network-based portal is associated with a second party, and wherein the processing computing device is associated with a third party.

8. A computer-implemented method implemented using a computer system including a first network-based portal configured to receive a plurality of data messages each comprising a plurality of data elements, a second network-based portal configured to receive the plurality of data messages from the first network-based portal, a first network communication link configured to exchange the plurality of data messages between the first network-based portal and the second network-based portal, the plurality of data messages formatted in a first protocol compatible with the first network communication link, and an analyzer computing device in communication with the first network-based portal and the second network-based portal via the first network communication link, wherein the analyzer computing device is in further communication with a processing computing device via a second network communication link separate from the first network communication link, and wherein the analyzer computing device includes at least one processor and at least one memory device, the method comprising:

receiving, by the at least one processor, from the first network-based portal via the first network communication link, an initial data message including one or more of the plurality of data elements, the initial data message formatted in the first protocol;

training, by the at least one processor, machine learning tools using a plurality of indicators associated with a plurality of historical messages, each of the plurality of historical messages routed to one of the first network communication link or the second network communication link;

analyzing, by the at least one processor using the trained machine learning tools, the one or more data elements of the initial data message to determine whether to route the initial data message to the second network-based portal via the first network communication link or to the processing computing device via the second network communication link, the first network communication link and the second network communication link having different communication protocols;

in response to determining to route the initial data message to the second network-based portal, routing, by the at least one processor, the initial data message to the second network-based portal via the first network communication link, and establishing, by the at least one processor, direct communication between the second network-based portal and the first network-based portal via the first network communication link, such that subsequent data messages associated with the initial data message are exchanged between the second network-based portal and the first network-based portal; and in response to determining to route the initial data message to the processing computing device via the second network communication link, reformatting, by the at least one processor, the initial data message into a second protocol compatible with the second network communication link, and transmitting, by the at least one processor, the reformatted initial data message to the processing computing device.

9. The computer-implemented method of claim 8 further determining, by the at least one processor using the one or more data elements of the initial data message, a particular server associated with the second network-based portal where to route the initial data message.

10. The computer-implemented method of claim 8, wherein routing the initial data message to the second network-based portal comprises displaying the initial data message on the second network-based portal.

11. The computer-implemented method of claim 8, wherein the machine learning tools include at least one of natural language processing, statistical analysis, or machine learning analysis.

12. The computer-implemented method of claim 8, wherein the first network communication link includes Internet-based communication protocols, and wherein the second network communication link includes a proprietary communications standard promulgated by the second network communication link for exchange of specialized data messages.

13. The computer-implemented method of claim 8, wherein establishing the direct communication between the second network-based portal and the first network-based portal further comprises exchanging the subsequent data messages until a resolution associated with the initial data message is achieved.

14. The computer-implemented method of claim 8, wherein the first network-based portal is associated with a first party, wherein the second network-based portal is associated with a second party, and wherein the processing computing device is associated with a third party.

15. A non-transitory computer-readable storage medium that includes computer-executable instructions that, when executed by at least one processor of a computer system including a first network-based portal configured to receive a plurality of data messages each comprising a plurality of data elements, a second network-based portal configured to receive the plurality of data messages from the first network-based portal, a first network communication link configured to exchange the plurality of data messages between the first network-based portal and the second network-based portal, the plurality of data messages formatted in a first protocol compatible with the first network communication link, and an analyzer computing device in communication with the first network-based portal and the second network-based portal via the first network communication link, wherein the analyzer computing device is in further communication with a processing computing device via a second network communication link separate from the first network communication link, and wherein the analyzer computing device includes the at least one processor and at least one memory device, the computer-executable instructions cause the at least one processor to:

receive, from the first network-based portal via the first network communication link, an initial data message including one or more of the plurality of data elements, the initial data message formatted in the first protocol;

train machine learning tools using a plurality of indicators associated with a plurality of historical messages, each of the plurality of historical messages routed to one of the first network communication link or the second network communication link;

analyze, using the trained machine learning tools, the one or more data elements of the initial data message to determine whether to route the initial data message to the second network-based portal via the first network communication link or to the processing computing device via the second network communication link, the first network communication link and the second network communication link having different communication protocols;

in response to determining to route the initial data message to the second network-based portal, route the initial data message to the second network-based portal via the first network communication link, and establish direct communication between the second network-based portal and the first network-based portal via the first network communication link, such that subsequent data messages associated with the initial data message are exchanged between the second network-based portal and the first network-based portal; and in response to determining to route the initial data message to the processing computing device via the second network communication link, reformat the initial data message into a second protocol compatible with the second network communication link, and transmit the reformatted initial data message to the processing computing device.

16. The non-transitory computer-readable storage medium of claim 15, wherein the computer-executable instructions further cause the at least one processor to determine, using the one or more data elements of the initial data message, a particular server associated with the second network-based portal where to route the initial data message.

17. The non-transitory computer-readable storage medium of claim 15, wherein routing the initial data message to the second network-based portal includes displaying the initial data message on the second network-based portal.

18. The non-transitory computer-readable storage medium of claim 15, wherein the machine learning tools includes at least one of natural language processing, statistical analysis, or machine learning analysis.

19. The non-transitory computer-readable storage medium of claim 15, wherein the first network communication link includes Internet-based communication protocols, and wherein the second network communication link includes a proprietary communications standard promulgated by the second network communication link for exchange of specialized data messages.

20. The non-transitory computer-readable storage medium of claim 15, wherein establishing the direct communication between the second network-based portal and the first network-based portal further includes exchanging the subsequent data messages until a resolution associated with the initial data message is achieved.

* * * * *